(12) United States Patent
Charoulet

(10) Patent No.: US 12,447,798 B2
(45) Date of Patent: Oct. 21, 2025

(54) AUTOMATIC TEMPERATURE CONTROL FOR REFRIGERATION SYSTEMS

(71) Applicant: Carrier Corporation, Palm Beach Gardens, FL (US)

(72) Inventor: Guillaume Charoulet, Franqueville Saint Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 253 days.

(21) Appl. No.: 18/308,280

(22) Filed: Apr. 27, 2023

(65) Prior Publication Data

US 2023/0347714 A1 Nov. 2, 2023

(30) Foreign Application Priority Data

Apr. 29, 2022 (EP) .................................... 22171015

(51) Int. Cl.
*B60H 1/00* (2006.01)
*B60P 3/20* (2006.01)
(52) U.S. Cl.
CPC ..... *B60H 1/00807* (2013.01); *B60H 1/00357* (2013.01); *B60H 1/00792* (2013.01); *B60H 1/00985* (2013.01); *B60P 3/20* (2013.01)
(58) Field of Classification Search
CPC .. F25D 11/003; F25D 29/003; F25D 2700/12; F25D 3/06; F25D 2400/34; B60H 1/00357; B60H 1/00364; B60H 2001/0015
See application file for complete search history.

(56) References Cited

U.S. PATENT DOCUMENTS

| | | | |
|---|---|---|---|
| 2017/0259648 A1* | 9/2017 | Putcha | B60P 3/007 |
| 2017/0372260 A1* | 12/2017 | Desmarais | G01K 3/04 |
| 2018/0039940 A1* | 2/2018 | Varga | G06Q 10/0832 |
| 2019/0263219 A1* | 8/2019 | Spath | B60H 1/00264 |

FOREIGN PATENT DOCUMENTS

JP 2005331123 A 12/2005

OTHER PUBLICATIONS

Extended European Search Report received for application No. 22171015.5, mailed on Oct. 10, 2022, 6 Pages.

* cited by examiner

*Primary Examiner* — Jianying C Atkisson
*Assistant Examiner* — Meraj A Shaikh
(74) *Attorney, Agent, or Firm* — Drew Folgmann

(57) ABSTRACT

A transport refrigeration system comprising: a refrigerated compartment, a refrigeration unit operably coupled to the refrigerated compartment, and a controller for controlling the environment within the refrigerated compartment by controlling the refrigeration unit; a container for storing perishable goods; and a wireless module secured to the container and configured to store a target container temperature; wherein the controller is configured to: receive the target container temperature from the wireless module responsive to the container being placed in the refrigerated compartment; and control the environment within the refrigerated compartment by controlling the operation of the refrigeration unit in accordance with the target container temperature.

13 Claims, 4 Drawing Sheets

AUTOMATIC TEMPERATURE CONTROL FOR REFRIGERATION SYSTEMS

CROSS REFERENCE TO RELATED APPLICATIONS

This application claims priority to European Patent Application No. 22171015.5 filed on Apr. 29, 2022.

BACKGROUND

The present invention relates to refrigeration systems, and more particularly the embodiments are concerned with an apparatus and method for automatically controlling the temperature of refrigeration systems.

Typically, cold chain distribution systems are used to transport and distribute cargo, or more specifically perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed at a specific temperature or within a suitable temperature range to avoid damage, spoilage or other undesirable effects.

Commonly, a cold chain distribution system includes static refrigeration units for storage of perishable goods in fixed locations (e.g. warehouses) and transport refrigeration units (TRUs) for transport of perishable goods between storage locations. The TRUs may include refrigerated trailers, refrigerated lorries (trucks) or refrigerated intermodal containers, for example.

Conventionally, refrigeration systems include a refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. The refrigerant compressor operates as a pump to pressurize, and control the circulation of, the refrigerant. Air or an air/gas mixture is drawn from the compartment containing perishable goods by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the refrigerated compartment. Alternatively, the refrigeration system may be operated in reverse to supply heated air to the refrigerated (i.e. temperature-controlled) compartment.

In commercially available refrigeration systems, the compressor, and typically other components of the refrigeration unit, is controlled based on a target internal temperature of the refrigerated compartment and environmental data such as a measured internal temperature of the refrigerated compartment and/or ambient air temperature. The operator of the refrigeration system, which may be a driver in the case of transport refrigeration systems, sets the target internal temperature of the refrigerated compartment (e.g. via a control interface) depending on the type of perishable goods to be placed in the refrigerated compartment (i.e. they set the temperature of the refrigerated compartment in order to avoid damage, spoilage or other undesirable effects).

BRIEF SUMMARY

Viewed from a first aspect of the invention, there is provided a transport refrigeration system comprising: a refrigerated compartment, a refrigeration unit operably coupled to the refrigerated compartment, and a controller for controlling the environment within the refrigerated compartment by controlling the refrigeration unit; a container for storing perishable goods; and a wireless module secured to the container and configured to store a target container temperature; wherein the controller is configured to: receive the target container temperature from the wireless module responsive to the container being placed in the refrigerated compartment; and control the environment within the refrigerated compartment by controlling the operation of the refrigeration unit in accordance with the target container temperature.

BRIEF DESCRIPTION OF THE DRAWINGS

The following descriptions should not be considered limiting in any way. With reference to the drawings, in which.

DETAILED DESCRIPTION

Figure 1:
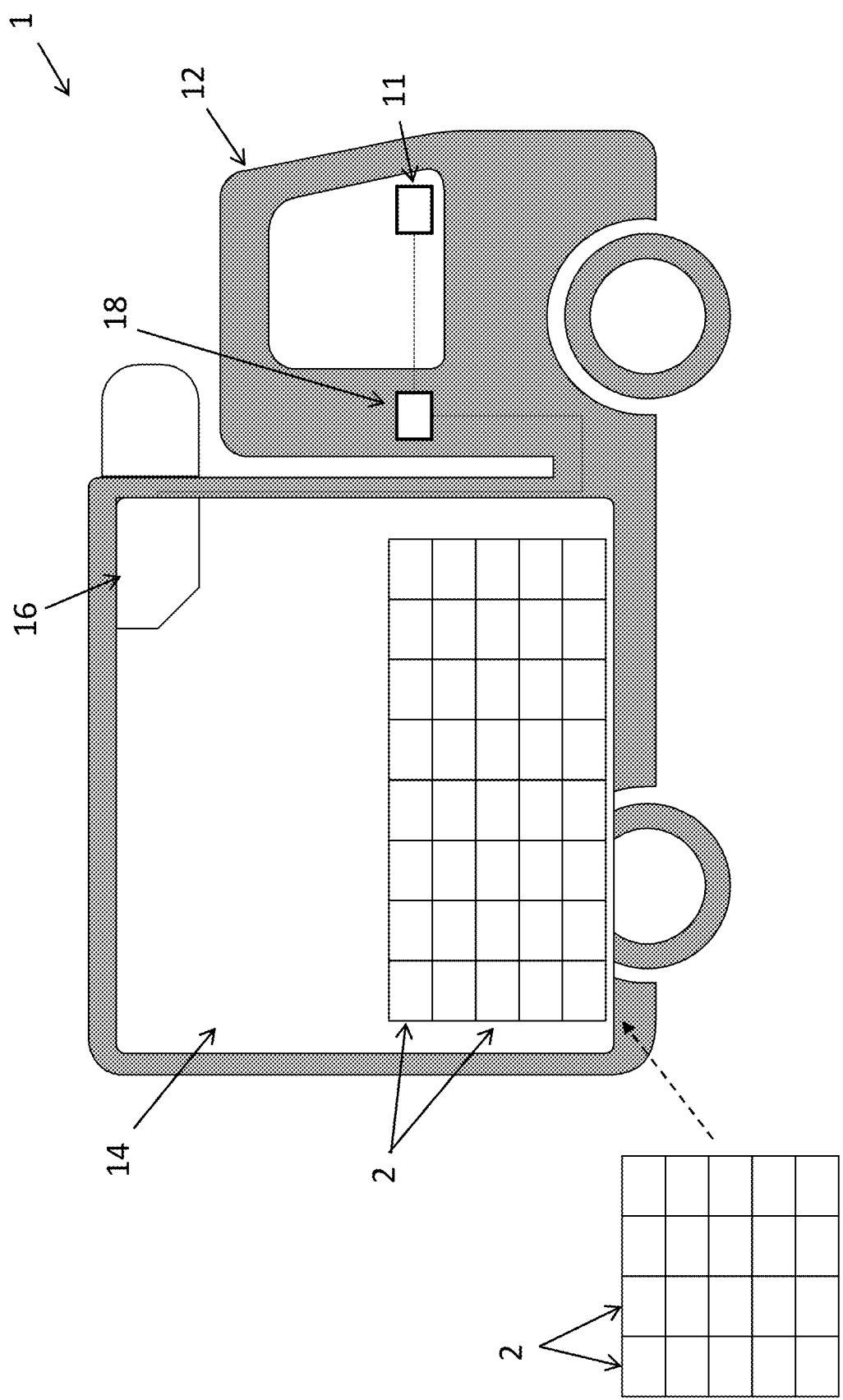
FIG. 1 shows a prior art transport refrigeration system.

The inventors have identified a problem associated with the systems of the prior art wherein the operator/driver may make a mistake in setting the temperature and/or, in the case of refrigeration systems with multiple compartments that can be controlled to have different internal temperatures, may make a mistake by putting the perishable goods to be transported in the wrong refrigerated compartment. It is considered that these issues may arise more often when multiple smaller containers are loaded into one or more compartments of a transport refrigeration system. These mistakes can result in the loss of the perishable goods due to damage, spoilage or other undesirable effect.

The present solution helps to address these issues by providing a container with a wireless module configured to store a target container temperature, e.g. to hold a record of a temperature that the container should be held at depending on the type of perishable goods that it is suitable for/contains.

The wireless module enables the system to determine the target temperature automatically, which helps mitigate or avoid risks from mistakes as well as reducing the manual steps required from the operator/driver in some situations, e.g. by dispensing with a need to manually set or adjust a temperature when the target temperature changes for a new set of perishable goods.

The transport refrigeration system may for example take the form of, or include, a refrigerated trailer (e.g. for a truck-trailer vehicle), refrigerated lorry or refrigerated intermodal container (shipping container), for example. Further, in view of the added abilities linked with automatic detection and/or control of temperature requirements, then the present concept may advantageously be implemented in the case of a driverless vehicle. Thus, the transport refrigeration system may comprise or take the form of a driverless refrigerated transport vehicle, such as a driverless road vehicle for example.

In the broadest aspect of the invention, there is provided a refrigeration system comprising: a refrigerated compartment, a refrigeration unit operably coupled to the refrigerated compartment, and a controller for controlling the environment within the refrigerated compartment by controlling the refrigeration unit; a container for storing perishable goods; and a wireless module secured to the container and configured to store a target container temperature; wherein the controller is configured to: receive the target container temperature from the wireless module responsive to the container being placed in the refrigerated compartment; and control the environment within the refrigerated compartment by controlling the operation of the refrigeration unit in accordance with the target container temperature.

In other words, there is provided a refrigeration system that includes all the features, and advantages, of the first aspect of the invention, differing only in that the refrigeration system is not a transport refrigeration system, e.g. the refrigerated compartment may be static/non-mobile. In an example, a refrigeration system according to this aspect of the invention may be included in a cold chain distribution system. The refrigeration system may comprise any or all of the optional features of the first aspect as described below.

Optionally, the wireless module is integrated into the container. In other words, the wireless module may be part of/embedded in the body of the container. For example, the container may comprise a rigid body into which the wireless module is embedded. Thus the container, which contains the perishable goods, may not be separated from the wireless module and reduces the likelihood of the perishable goods from being stored at an incorrect temperature.

The wireless module may be embedded in a base or a side wall of the container.

In one example, the wireless module may be embedded in a lid (e.g. cover, top) adapted for sealing a certain type of container. Thus, once a container has been filled with a certain type of perishable good, then the container may be fitted with a lid comprising a wireless module configured with a target container temperature suitable for said type of perishable good. This has the advantage that lids can be interchanged between containers such that a container can be used to hold any type of perishable good at the correct target temperature.

Advantageously, the container may be reusable. Alternatively, the container may be non-reusable (e.g. single-use). The container may be made of a recyclable material (e.g. plastic or cardboard).

Optionally, the wireless module may be detachably secured to the container. In other words, the wireless module may be secured to the container by detachable fastening means (for example, a hook and loop fastener, a magnetic fastener or a clip). Thus, advantageously, the wireless module may be removed from a container and reapplied to another (different type of) container.

Optionally, the wireless module comprises a control interface for setting the target container temperature in the wireless module by a user. The target container temperature may be set by the user by selecting the type of perishable goods within the container which the wireless module associates with a target container temperature and communicates the target container temperature to the controller. It is also contemplated that if the user selects the type of perishable goods within the container and the wireless module communicates the type of perishable goods to the controller the controller may then associate the type of perishable goods with a temperature. The control interface may be a touchscreen, dial or keypad for inputting or selecting the target container temperature.

Optionally, the refrigeration system comprises a transceiver for setting the target container temperature in the wireless module by a user.

Allowing a user to change/set the value of the target container temperature stored in the wireless module improves the versatility/flexibility of the wireless module system. For example, a producer (of a perishable good) may be able to set the value of wireless module in order to ensure that their perishable goods are transported through a cold chain distribution system (to an end user) at the correct temperature without requiring drivers of consecutive transport refrigeration systems (within the cold chain distribution system) to manually set the temperature of each refrigerated compartment the containers are placed in. Accordingly, the 'user' of the control interface or the transceiver, responsible for the input/selection of the target container temperature, is considered to be a producer or distribution manager, and is different to the 'user' (driver) of the transport refrigeration system, for example.

Optionally, the target container temperature is permanently stored in the wireless module. In some circumstances, it may be advantageous to prevent users from changing the target container temperature stored in the wireless module (e.g. to further mitigate any user error).

The wireless module may comprise a memory, wherein the target container temperature is stored. The memory may be electrically erasable, programmable, read-only memory (EEPROM). The memory may be read-write or write-once, read-many (WORM).

Optionally, the wireless module comprises a visual indicator of the target container temperature.

Where the target container temperature is permanently stored in the wireless module, the visual indicator may comprise at least one of an external marking indicating the value of the target container temperature, an external marking indicating a type of perishable good, and a colour of the wireless module. Thus, once the wireless module has been manufactured and a target container temperature has been stored within it, a user can clearly identify what target container temperature the wireless module corresponds to.

Where the target container temperature is not permanently stored in the wireless module, the visual indicator may comprise an electronic display. The electronic display may comprise one or more LED lights or a screen arranged to indicate the target container temperature. The electronic display may be part of or associated with the control interface of the wireless module.

Optionally, the container comprises a visual indicator of the target container temperature. The visual indicator may comprise at least one of an external marking indicating the value of the target container temperature, an external marking indicating a type of perishable good, and a colour of the container. This may be particularly beneficial in an embodiment wherein the wireless module has been embedded in the container and the target container temperature has been permanently stored in the wireless module, as a user may easily identify what target container temperature the container corresponds to (and what perishable goods may be contained within it).

Where the wireless module has been embedded in a lid of the container, the lid may comprise a visual indicator of the target container temperature as described above.

Optionally, the transport refrigeration system comprises a user device configured to display the target container temperature and/or an internal temperature of the refrigerated compartment. The user device may be configured to display other characteristics/parameters of the refrigeration system, and/or may be configured to alert the user to potential operational errors of the transport refrigeration system and its component parts as well as loading errors (for example, a loading error may include an instance where the user has loaded the same refrigerated compartment with containers/wireless modules that have different target temperatures). The user device may be, for example, a smartphone or tablet. In the alternative or additionally, the user device may be integrated with the cabin/cockpit/dashboard of the vehicle of the transport refrigeration system.

Optionally, the transport refrigeration system comprises at least one sensor associated with the refrigeration unit. The at least one refrigeration unit sensor may be arranged to monitor one or more operational parameter(s) of the refrigeration unit. For example, the at least one refrigeration unit sensor may include a sensor configured to monitor a compressor speed and/or a sensor configured to monitor a compressor temperature.

Optionally the transport refrigeration system comprises at least one sensor associated with the refrigerated compartment. The at least one refrigerated compartment sensor may be arranged to monitor one or more parameter(s) of the refrigerated compartment. For example, the at least one refrigerated compartment sensor may include a sensor configured to monitor an internal temperature of the refrigerated compartment and/or a sensor configured to monitor a humidity of the refrigerated compartment.

The sensor(s) may be communicatively connected to the controller of the refrigeration system and/or the user device.

The wireless module may comprise a wireless transmitter for transmitting the target container temperature to (the wireless receiver of) the controller. In the alternatively or additionally, the transport refrigeration system may comprise a wireless receiver separate to the controller, but in communication therewith in order to provide information concerning the target container temperature. In an example, the wireless receiver may be remotely located from the controller (in the transport refrigeration system), but in wired communication with the controller.

The wireless module may comprise a wireless receiver of the container. The wireless module may be a wireless transceiver.

In some examples, the wireless module comprises an RFID tag and the transport refrigeration system comprises an RFID reader for providing information about the target container temperature to the controller. The RFID reader may be an RFID reader of the controller, or may be an RFID reader separated from the controller but in communication therewith. The wireless module may comprise a passive RFID tag. That is to say, the RFID tag may be configured to draw power from an RF excitation field to power the RFID tag. The use of a passive RFID tag advantageously means that it is not necessary to include a battery. RFID tags including batteries have a limited shelf-life and are larger and more expensive than passive RFID tags. Passive RFID tags may have a communication range of up to 10 m.

On the other hand, the wireless module may be an active or semi-passive RFID tag, and may comprise a battery. That is to say, the RFID tag may be configured to draw power from an internal battery for RF communication over increased distances relative to a passive RFID tag. Semi-passive RFID tags may have a communication range of up to 100 m. Active RFID tags may have a communication range of at least 100 m.

The type of RFID tag may be selected based on the size of the refrigerated compartment with which it is intended to be used. For example, for refrigerated compartments that do not have dimensions larger than 10 m, a passive RFID tag may be considered suitable.

The type of RF communication may be Low Frequency, High Frequency or Ultra High Frequency.

Optionally, the wireless module comprises a Bluetooth™ wireless transmitter and the controller comprises a Bluetooth™ wireless receiver.

Optionally, the wireless module and the controller are configured to communicate over a WiFi connection.

The proposed arrangement will have advantages for a plurality of containers and in some cases therefore the transport refrigeration system may comprise a large number of containers, such as 10 or more or 50 or more containers.

Preferably, each of the plurality of containers may have a respective wireless module that stores the target container temperature of its container. However, in a situation where a plurality of containers is to be placed in the same refrigerated compartment and have the same target container temperature (e.g. they contain the same type of perishable good), then it is only required that at least one of the containers has a respective wireless module.

In other words, the plurality of containers comprises at least one container having a wireless module secured to the container and configured to store a target container temperature.

The transport refrigeration system may also be arranged to handle a situation where one or more of a plurality of containers have different target container temperatures from one or more of the plurality of containers (e.g. they contain different types of perishable good).

By way of example, the transport refrigeration system may comprise a second container for storing perishable goods and a second wireless module secured to the second container configured to store a second target container temperature. Third and further containers may be present in a similar way. With a second container present then the controller may be arranged to: receive the first target container temperature from the first wireless module responsive to the first container being placed in the refrigerated compartment; receive the second target container temperature from the second wireless module responsive to the second container being placed in the refrigerated compartment; and responsive to the first target container temperature and the second target container temperature not being equal: raise an alert and/or control the operation of the refrigeration unit in accordance with one of the first and second target container temperature; responsive to the first target container temperature and the second target container temperature being equal: control the operation of the refrigeration unit in accordance with the first and second target container temperature.

The controller thus advantageously has the capability of (e.g. may be configured for) receiving temperatures of the containers from the wireless modules and, if the target container temperatures are the same, it may control the compartment temperature accordingly whereas, if the target container temperatures are different, it may trigger some suitable reactive action. One possibility is for an alert. Another possibility is for the controller to select one of the two different temperatures (or indeed more than two if there are further containers with different target container temperatures). The controller may be configured to perform these functions, e.g. via software or hardware configuration, or otherwise adapted to have the required capabilities.

In terms of the reactive action, when the target container temperatures differ, the alert may be an alert provided to the immediate user (such as a driver of the vehicle) so that they can physically move the containers, such as in the case of a misplaced container. Alternatively or additionally it may be an alert sent to some remote monitoring station, e.g. associated with overall monitoring of the transport refrigeration system or of a cold chain distribution system for which the transport refrigeration system is a part. This can allow for other further steps, e.g. changing future handling of goods that may have been stored at the wrong temperature to reduce risk of spoilage or to identify prospective damaged goods.

If the reactive action includes selection of the compartment temperature then this may be done using considerations relevant to the goods expected to be handled by the system. In some cases the controller may control the operation of the refrigeration unit in accordance with the lowest of the first and second target container temperature, for example if the nature of the goods is expected to be such that a lower temperature will not damage the goods in either of the containers. Alternatively, the controller may be arranged to control the operation of the refrigeration unit in accordance with the one of the first and second target container temperatures that reflects the largest number of containers in the compartment. In this case the system may then store a smaller number of containers at the wrong temperature, but the risk of damage to the larger number of containers is avoided. In another possible implementation the containers may (e.g. via the wireless module) indicate a priority concerning the temperature and the system may act to store higher priority goods at the specified temperature, thus allowing damage only for lower priority goods.

It will also be appreciated that transport refrigeration system may advantageously include multiple compartments for storing containers at different temperatures, such as two or more compartments. The transport refrigeration system may comprise: a first refrigerated compartment and a first controller for controlling the environment within the first refrigerated compartment; and a second refrigerated compartment and a second controller for controlling the environment within the second refrigerated compartment. The first and second controller may be separate controllers or they may be parts of a larger combined control system, e.g. separate software elements or the like within a single overall controller for the transport refrigeration system. In the case of a single overall controller, the controller may include a first wireless receiver (first controller) located in the first refrigerated compartment and a second wireless receiver (second controller) located in the second refrigerated compartment. As discussed above, the wireless receivers may be remotely located from the main elements of the control system (e.g. the microprocessor) but in communication therewith. In the case of such two compartments then the refrigeration unit may be operably coupled to both of the first refrigerated compartment and second refrigerated compartment, or alternatively there may be separate refrigeration units for each compartment.

The first refrigerated compartment and second refrigerated compartment may each comprise shielding for blocking or attenuating signals from the wireless modules. This can then enable the controller(s) (comprising a wireless receiver for each compartment) to be arranged such that: responsive to a first container being placed in the first refrigerated compartment, a first target container temperature is received by the first controller so that it may control the environment within the first refrigerated compartment by controlling the refrigeration unit in accordance with the target container temperature; and responsive to a second container being placed in the second refrigerated compartment, a second target container temperature is received by the second controller so that it may control the environment within the second refrigerated compartment by controlling the refrigeration unit in accordance with the target container temperature. Thus, the shielding may block the signal or change its strength so that the respective target container temperature is correctly associated with the relevant compartment, e.g. since a wireless receiver for that compartment only receives from containers within that compartment, or receives the strongest signal from containers within that compartment. The shielding may for example be electromagnetic shielding.

Viewed from a second aspect of the invention, there is provided a method of controlling a transport refrigeration system, the refrigeration system comprising: a refrigerated compartment, a refrigeration unit operably coupled to the refrigerated compartment, and a controller for controlling the environment within the refrigerated compartment by controlling the refrigeration unit; a container for storing perishable goods; and a wireless module secured to the container and configured to store a target container temperature, the method comprising: receiving, using the controller, the target container temperature from the wireless module responsive to the container being placed in the refrigerated compartment; and controlling, using the controller, the operation of the refrigeration unit in accordance with the target container temperature.

Optionally, the method comprises: securing the wireless module to the container. Securing the wireless module to the container may comprise using detachable fastening means (for example, a hook and loop fastener, a magnetic fastener or a clip or screws). Securing the wireless module to the container may comprise using non-detachable (e.g. permanent) fastening means (for example, glue). Alternatively, the method comprises providing a container with an integrated wireless module (for example, the container may comprise a rigid body in which the wireless module is embedded).

Optionally, the method comprises: setting the target container temperature in the wireless module using an interface of the wireless module; or setting the target container temperature in the wireless module using a transceiver.

Setting the target container temperature in the wireless module may comprise inputting the target container temperature or selecting the target container temperature from a plurality of container temperature options. The control interface may be a touchscreen, dial or keypad which may be operated to input or select the target container temperature.

Optionally, the target container temperature is permanently stored in the wireless module; and the wireless module and/or container includes a visual indicator of the target container temperature, and wherein the method comprises: storing perishable goods in the container that have a target temperature that corresponds to the target container temperature indicated by the visual indicator of the wireless module and/or container.

Advantageously, a user is able to use the visual indicator to ensure that the perishable goods go in a container that will ensure that they are maintained at an appropriate/suitable target container temperature.

Optionally, the target container temperature is permanently stored in the wireless module; and the wireless module is embedded in a lid for a container, wherein the lid includes a visual indicator of the target container temperature, and the method comprises: storing perishable goods in the container and selecting a lid for the container that has a target container temperature indicated by the visual indicator that corresponds to the target temperature of the perishable goods.

Optionally, the target container temperature is not permanently stored in the wireless module (e.g. the wireless module comprises a read-write memory) and the visual indicator of the wireless module may comprise an electronic display. Thus the method may comprise displaying, using an electronic display (which may comprise one or more LED lights or a screen), the target container temperature of the wireless module. The electronic display may be part of or associated with the control interface of the wireless module.

Optionally, the method comprises displaying, using a user device, the target container temperature and/or an internal temperature of the refrigerated compartment.

Optionally, the method comprises displaying, using a user device, one or more operating parameter(s) of the refrigeration unit.

Optionally, the method comprises displaying, using a user device, one or more parameter(s) of the refrigerated compartment.

Optionally, the method comprises displaying, using a user device, an alert that a container with a target container temperature has been loaded into the same refrigerated compartment as a container with a different target container temperature.

Optionally, the method comprises displaying, using a user device, an alert that the internal temperature of the refrigerated compartment is outside a predetermined range of the target container temperature. Optionally, the method comprises displaying, using a user device, an alert that the refrigeration unit is unable to meet the refrigeration demands required to maintain the internal temperature of the refrigerated compartment within a predetermined range of the target container temperature.

Optionally, the method comprises receiving, using the controller, a first target container temperature from a first wireless module secured to a first container responsive to the first container being placed in the refrigerated compartment; receiving, using the controller, a second target container temperature from a second wireless module secured to a second container responsive to the second container being placed in the refrigerated compartment; and responsive to the first target container temperature and the second target container temperature not being equal: raising an alert and/or controlling, using the controller, the operation of the refrigeration unit in accordance with one of the first and second target container temperature; responsive to the first target container temperature and the second target container temperature being equal: controlling, using the controller, the operation of the refrigeration unit in accordance with the first and second target container temperature.

The method thus advantageously provides the capability of receiving temperatures of multiple (e.g. two) containers from the associated wireless modules and, if the target container temperatures are the same, it may control the compartment temperature accordingly whereas, if the target container temperatures are different, it may trigger some suitable reactive action. One possibility is for an alert. Another possibility is for the controller to select one of the two different temperatures (or indeed more than two if there are further containers with different target container temperatures). The controller may be configured to perform these functions, e.g. via software or hardware configuration, or otherwise adapted to have the required capabilities.

When the target container temperatures differ, raising an alert may comprise providing an alert provided to the immediate user (such as a driver of the vehicle) so that they can physically move the containers, such as in the case of a misplaced container. Alternatively or additionally it may comprise sending an alert to a remote monitoring station, e.g. associated with overall monitoring of the transport refrigeration system or of a cold chain distribution system for which the transport refrigeration system is a part. Thus the raising of the alert may allow for other further steps, e.g. changing future handling of goods that may have been stored at the wrong temperature to reduce risk of spoilage or to identify prospective damaged goods.

When the target container temperatures differ, controlling the compartment temperature may comprise selecting either the first or second target container temperature. This selection may comprise using considerations relevant to the goods expected to be handled by the system. In some cases the controller may control the operation of the refrigeration unit in accordance with the lowest of the first and second target container temperature, for example if the nature of the goods is expected to be such that a lower temperature will not damage the goods in either of the containers. Alternatively, the controller may be arranged to control the operation of the refrigeration unit in accordance with the one of the first and second target container temperatures that reflects the largest number of containers in the compartment. In this case the system may then store a smaller number of containers at the wrong temperature, but the risk of damage to the larger number of containers is avoided. In another possible implementation the containers may (e.g. via the wireless module) indicate a priority concerning the temperature and the system may act to store higher priority goods at the specified temperature, thus allowing damage only for lower priority goods.

Optionally, the transport refrigeration system comprises: a first refrigerated compartment and a first controller for controlling the environment within the first refrigerated compartment; and a second refrigerated compartment and a second controller for controlling the environment within the second refrigerated compartment; wherein the refrigeration unit is operably coupled to both of the first refrigerated compartment and second refrigerated compartment; and wherein the first refrigerated compartment and second refrigerated compartment each comprise shielding; the method comprising: placing the container in either the first refrigerated compartment or second refrigerated compartment; and responsive to the container being placed in the first refrigerated compartment, receiving the target container temperature by the first controller and controlling the environment within the first refrigerated compartment by controlling the refrigeration unit in accordance with the target container temperature; responsive to the container being placed in the second refrigerated compartment, receiving the target container temperature by the second controller and controlling the environment within the second refrigerated compartment by controlling the refrigeration unit in accordance with the target container temperature.

The first and second controller may be separate controllers or they may be parts of a larger combined control system, e.g. separate software elements or the like within a single overall controller for the transport refrigeration system. In the case of a single overall controller, the controller may include a first wireless receiver (first controller) located in the first refrigerated compartment and a second wireless receiver (second controller) located in the second refrigerated compartment. As discussed above, the wireless receivers may be remotely located from the main elements of the control system (e.g. the microprocessor) but in communication therewith. In the case of such two compartments then the refrigeration unit may be operably coupled to both of the first refrigerated compartment and second refrigerated compartment, or alternatively there may be separate refrigeration units for each compartment.

The first refrigerated compartment and second refrigerated compartment may each comprise shielding for blocking or attenuating signals from the wireless modules.

Accordingly, the method may comprise, responsive to the container being placed in the first refrigerated compartment, receiving the target container temperature by the second controller; determining, based on the strength of the transmission of the target container temperature, that the container has been placed in the first refrigerated compartment; and disregarding the received target container temperature.

In other words, the method may comprise identifying, at a controller, that the strength of the received wireless signal comprising the target container temperature is below a predetermined threshold, and thus is from a container placed in a refrigerated compartment that is not associated with the controller.

Similarly, the method may comprise receiving, at a controller, a first wireless signal comprising a first target container temperature and a second wireless signal comprising a second target container temperature; and controlling the environment within the associated refrigerated compartment by controlling the refrigeration unit in accordance with the target container temperature having the greater signal strength.

For example, the controller may be configured to compare the signal strengths of the first and second wireless signals and a signal may be considered to be 'stronger' if it has an intensity greater than an intensity of the other signal by a predetermined value (e.g. absolute value or relative value).

Alternatively, the shielding may be arranged such that it blocks wireless signals completely, such that a controller may not receive any target container temperature(s) from containers not placed in the refrigerated compartment with which it is associated and/or within which it is located.

The above thus prevents containers placed in one compartment from influencing the temperature control of another compartment.

Preferably, the shielding is electromagnetic shielding for blocking electromagnetic wireless signals; however, it is envisaged that the type of shielding will be selected depending on the type of signals transmitted by the wireless module(s). Viewed from a third aspect of the invention, there is provided a computer-readable storage medium comprising instructions which, when executed by a controller of a transport refrigeration system, cause the controller to carry out a method of controlling the transport refrigeration system, the transport refrigeration system comprising: a refrigerated compartment and a refrigeration unit operably coupled to the refrigerated compartment; a container for storing perishable goods; and a wireless module secured to the container and configured to store a target container temperature; the method comprising: receiving, using the controller, the target container temperature from the wireless module secured to the container responsive to the container being placed in the refrigerated compartment; and controlling, using the controller, the environment within the refrigerated compartment by controlling the operation of the refrigeration unit in accordance with the target container temperature.

The third aspect of the invention may provide the advantages as provided by the method of the second aspect of the invention. Optionally, the third aspect of the invention can include any one or more or each of the optional features described in relation to the first or second aspect, as appropriate.

FIG. 1 shows a transport refrigeration system 1 according to the prior art. The transport refrigeration system 1 comprises, or at least is associated with, a vehicle 12. As shown in FIG. 1, the vehicle 12 may be a van or truck comprising a refrigerated compartment 14. Alternatively, the transport refrigeration system 1 may comprise a trailer comprising the refrigerated compartment 14 and the vehicle 12 is a tractor unit for towing the trailer.

The vehicle 12 comprises a vehicle engine (not shown). Alternatively or additionally, the vehicle 12 may include an electric motor configured to be powered by, for example, a battery or a fuel cell. The vehicle 12 may include an engine controller configured to control the operation of the vehicle engine and/or electric motor. The engine controller may be an electronic controller including a processor and an associated memory comprising computer-executable instructions that, when executed by the processor, cause the processor to perform various operations.

The refrigerated compartment 14 is operably coupled with a refrigeration unit 15 of the refrigeration system 1, i.e. in use, the refrigeration unit 15 is operated to maintain and/or control an internal temperature of the refrigerated compartment 14 by heating or cooling the refrigerated compartment 14. The refrigerated compartment 14 comprises one or more doors (not shown) for access to the refrigerated compartment 14, e.g. to move cargo (e.g. containers 2 containing perishable goods) in and out of the refrigerated compartment 14.

The refrigeration unit 15 includes a refrigerant compression device (not shown), a refrigerant heat rejection heat exchanger (not shown), an expansion device (not shown), and a refrigerant heat absorption heat exchanger (evaporator) 15 connected in refrigerant flow communication in a closed loop refrigerant circuit and arranged in a conventional refrigeration cycle.

The refrigerant compression device may comprise a single-stage or multiple-stage compressor such as, for example, a reciprocating compressor or a scroll compressor.

The refrigeration unit 15 may also include one or more fans (not shown) associated with the refrigerant heat rejection heat exchanger and/or the refrigerant heat absorption heat exchanger.

The refrigeration unit 15 is supplied power via a power supply system (not shown) electrically coupled to the refrigeration unit 15. The power supply system may comprise a power source, such as a battery, and/or an engine coupled to an electrical generator. The power supply system may comprise at least one power conversion component, e.g. at least one of an AC to AC voltage/frequency converter, an AC to DC rectifier, a DC to AC inverter, and a DC to DC voltage converter.

The transport refrigeration system 1 also includes a controller 18 configured for controlling operation of the refrigeration system 1 including, but not limited to, operation of various components of the refrigeration unit 15 to provide and maintain a desired thermal environment within the refrigerated compartment 14. Particularly, the controller 18 may be configured to operate the compression device to control the flow of refrigerant through the refrigerant circuit. The controller 18 may be configured to operate the one or more fans associated with the refrigerant heat rejection heat exchanger and/or the refrigerant heat absorption heat exchanger. Generally, the controller 18 is positioned within/integrated with (a component of) the refrigeration unit 15.

The vehicle 12 typically includes a control panel 11 for allowing a user (e.g. the driver of the vehicle 12) to send instructions to the controller 18 to control the operation of the transport refrigeration system 1. For this purpose, the control panel 11 is typically arranged in wired/electronic communication with the controller 18

In use, the driver may load the compartment 14 of the transport refrigeration system 1 with at least one container 2 holding perishable goods and set a target internal temperature of the refrigerated compartment 14 using the control panel 11. Thus, the target internal temperature of the refrigerated compartment 14 is selected by the driver based on the type of perishable goods that have been (or will be) placed in the refrigerated compartment 14 and the controller 18 operates the refrigeration unit 15 in order to maintain the internal temperature of the refrigerated compartment 14 at the target internal temperature.

However, the driver may make a mistake in setting the temperature, and/or, in the case of refrigeration systems 1 with multiple compartments that can be controlled to have different internal temperatures, may make a mistake by putting a container 2 to be transported in the wrong refrigerated compartment 14. These mistakes result in the loss of the perishable goods in the at least one container 2 due to damage, spoilage or any other undesirable effect.

Figure 2:
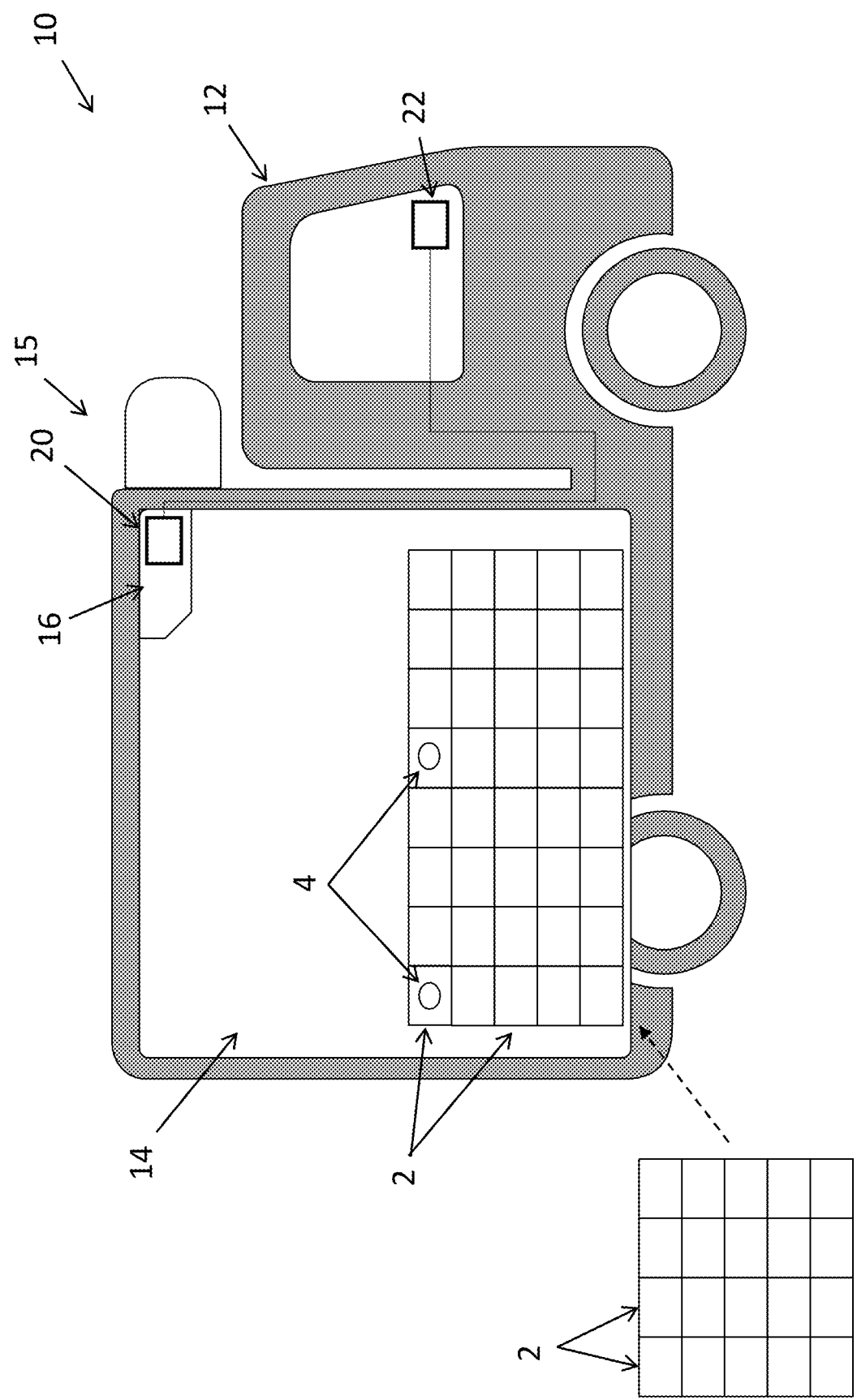
FIG. 2 shows a proposed transport refrigeration system.

FIG. 2 shows a transport refrigeration system 10. In a similar manner to the transport refrigeration system 1, the transport refrigeration system 10 comprises, or at least is associated with, a vehicle 12. In a similar manner to the transport refrigeration system 1, the transport refrigeration system 10 comprises a refrigeration unit 15 operably coupled to a refrigerated compartment 14 for controlling the environment within the refrigerated compartment 14.

The refrigerated compartment 14 is configured to hold at least one container 2. Each container 2 is a reusable container for storing perishable goods (e.g. fruits, vegetables, grains, beans, nuts, eggs, dairy, seed, flowers, meat, poultry, fish, ice, or pharmaceuticals). One or more or each of the containers 2 may have a wireless module 4 secured to it. In other words, each wireless module 4 may be attached to, fixed to, or part of (e.g. integrated with/embedded in), its respective container 2.

The wireless module 4 comprises a memory and a wireless transmitter. Each wireless module 4 is configured to store a target container temperature, e.g. a target temperature that the container 2 should be stored at based on the perishable goods that are in the container 2. In a situation where a plurality of containers 2 are placed in the refrigerated compartment 14 that have the same target container temperature (for example, they contain the same type of perishable good), then only one wireless module 4 may be necessary for that particular plurality of containers 2 (e.g. a single wireless module is secured to a single container of the plurality of containers 2). However, preferably, each container 2 has a respective module 4 that stores the target container temperature of its container 2.

In refrigeration system 10, the controller 20 is configured to be able to wirelessly communicate with the wireless module 4. Particularly, the controller 20 is configured to, responsive to the container 2 having the wireless module 4 being placed in the refrigerated compartment 14, receive the target container temperature from the wireless module 4; and configured to control the environment within the refrigerated compartment 14 by controlling the operation of the refrigeration unit 15 in accordance with the target container temperature.

In an embodiment, the wireless module 4 comprises a (passive or active) RFID tag and the controller 20 comprises an RFID reader/transceiver. Alternatively, the wireless module 4 and the controller 20 may wirelessly communicate through Bluetooth™ or WiFi transmitters/receivers.

In an embodiment, the wireless module 4 comprises a control interface for setting the target container temperature by a user. Alternatively, the transport refrigeration system 10 includes a user transceiver for setting the target container temperature in the wireless module 4 by a user. Preferably, this step of setting the target container temperature would be done at the point that the containers 2 are loaded with perishable goods, prior to the containers 2 being provided to the transport refrigeration unit 10. This reduces the possibility that the target container temperature is incorrect or does not correspond to the preferred temperature for the perishable goods.

In an embodiment, the target container temperature is permanently stored in the wireless module 4, e.g. upon manufacture of the container and/or wireless module 4.

In an embodiment wherein the target container temperature is permanently stored in the wireless module 4, the wireless module 4 may comprise a visual indicator of the target container temperature. For example, the wireless module 4 may be externally marked with the target container temperature or a type of perishable good which it should be used with, or may be coloured a predetermined colour. Similarly, where the target container temperature is permanently stored in the wireless module 4 and the wireless module 4 is permanently embedded in the container 2, the container 2 may comprise a visual indicator of the target container temperature. For example, the container 2 may be externally marked with the target container temperature or a type of perishable good which should be stored in it (that is compatible with the target container temperature), or may be coloured a predetermined colour.

In FIG. 2, the controller 20 is located in the refrigerated compartment 14 for improved line-of-sight communication with the wireless module(s) 4. Furthermore, to protect the controller 20, it may be integrated with the evaporator 16 of the refrigeration unit 15. However, it is not necessary for all of the electronic components of the controller 20 to be arranged in this way, and, for example, just the wireless receiver components (e.g. RFID transceiver) of the controller 20 may be positioned in the refrigerated compartment 14. Where the bulk of the components of the controller 20 are positioned in the vehicle 12 (e.g. on the tractor unit of a tractor and trailer configuration) and the wireless receiver of the controller 20 is positioned in the refrigerated compartment 14, the controller 20 may comprise a suitable wired data connection to the wireless receiver.

Even though no input from the user/driver is required, the transport refrigeration system 10 may comprise a user device 22 in order to provide feedback of the operation of the refrigeration system 10 to the user/driver. The user device 22 may be relayed information/data from one or more of the controller 20, at least one sensor associated with the refrigeration unit 15 (e.g. a compressor speed sensor), and at least one sensor associated with the refrigerated compartment 14 (e.g. an internal temperature sensor).

Figure 3:
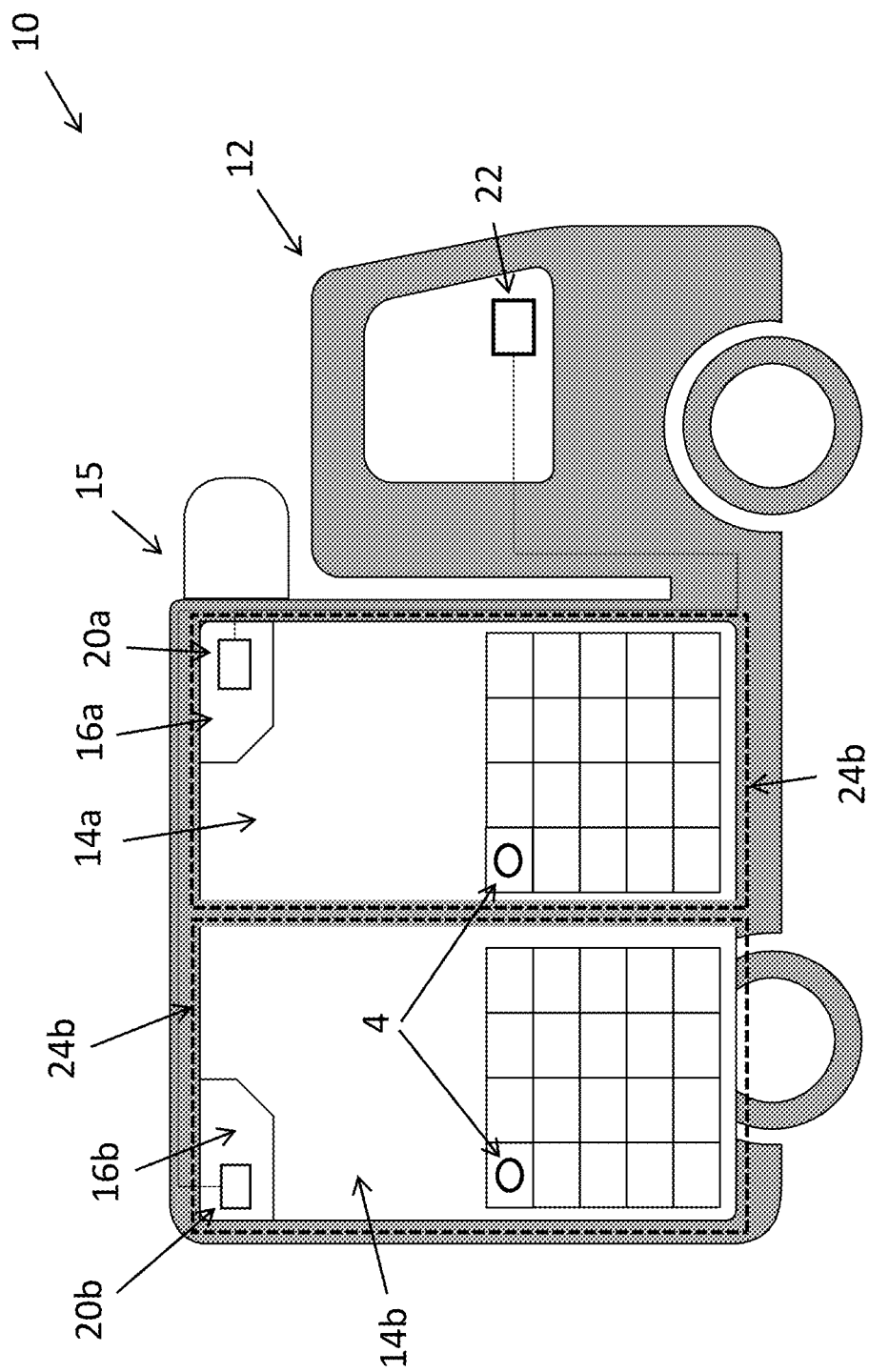
FIG. 3 shows a transport refrigeration system comprising multiple refrigerated compartments.

FIG. 3 shows another example of a transport refrigeration system 10 which comprises a plurality of refrigerated compartments. In the example shown, the transport refrigeration system 10 comprises a first refrigerated compartment 14a and a first controller 15a for controlling the environment within the first refrigerated compartment 14a, and a second refrigerated compartment 14b and a second controller 15b for controlling the environment within the second refrigerated compartment 14b.

Alternatively, the transport refrigeration system 10 may comprise a controller comprising a first wireless receiver and a second wireless receiver. The first wireless receiver may be located in the first refrigerated compartment 14a, e.g. positioned to receive a wireless signal (comprising a target container temperature) from a wireless module 4 placed in the first compartment 14a. The second wireless receiver may be located in the second refrigerated compartment 14b, e.g. positioned to receive a wireless signal (comprising a target container temperature) from a wireless module 4 placed in the second compartment 14b.

In the example shown, the refrigeration unit 15 comprises a first evaporator 16a positioned in the first refrigerated compartment 14a and configured for refrigerant heat exchange with the environment of the compartment 14a, and a second evaporator 16b positioned in the second refrigerated compartment 14b and configured for refrigerant heat exchange with the environment of compartment 14b.

Alternatively, the transport refrigeration system 10 may comprise a first refrigeration unit operably coupled to the first refrigerated compartment 14a and configured to control the environment within the first refrigerated compartment 14a, and a second refrigeration unit operably coupled to the second refrigerated compartment 14b and configured to control the environment within the second refrigerated compartment 14b.

In order to prevent the first controller 20a from receiving a target container temperature from a wireless module 4 secured to a container 2 that has been placed in the second refrigerated compartment 14b, and vice versa, each of the first compartment 14a and second compartment 14b comprise shielding 24a, 24b.

The shielding 24a, 24b is arranged to attenuate a wireless signal transmitted through it by a wireless module 4. For example, the shielding 24a, 24b may be configured to attenuate the wireless signal completely, e.g. block the wireless signal, such that the first controller 20a may not receive a wireless signal at all from a wireless module 4 placed in the second compartment 14b. Alternatively, the shielding 24a, 24b may attenuate the wireless signal, and the first controller 20a may be configured to identify that a wireless signal with a signal strength lower than a predetermined threshold has come from a wireless module 4 placed in the second compartment 14b, and therefore should be disregarded.

The shielding 24a, 24b may be electromagnetic shielding 24a, 24b (e.g. when the wireless signal is an electromagnetic signal). The electromagnetic shielding 24a, 24b may comprise one or more sheets, meshes or screens made of metal. The metal may comprise at least one of copper, brass, nickel, silver, steel, and tin. The electromagnetic shielding 24a may enclose the first compartment 14a and the electromagnetic shielding 24b may enclose the second compartment 14b.

Figure 4:
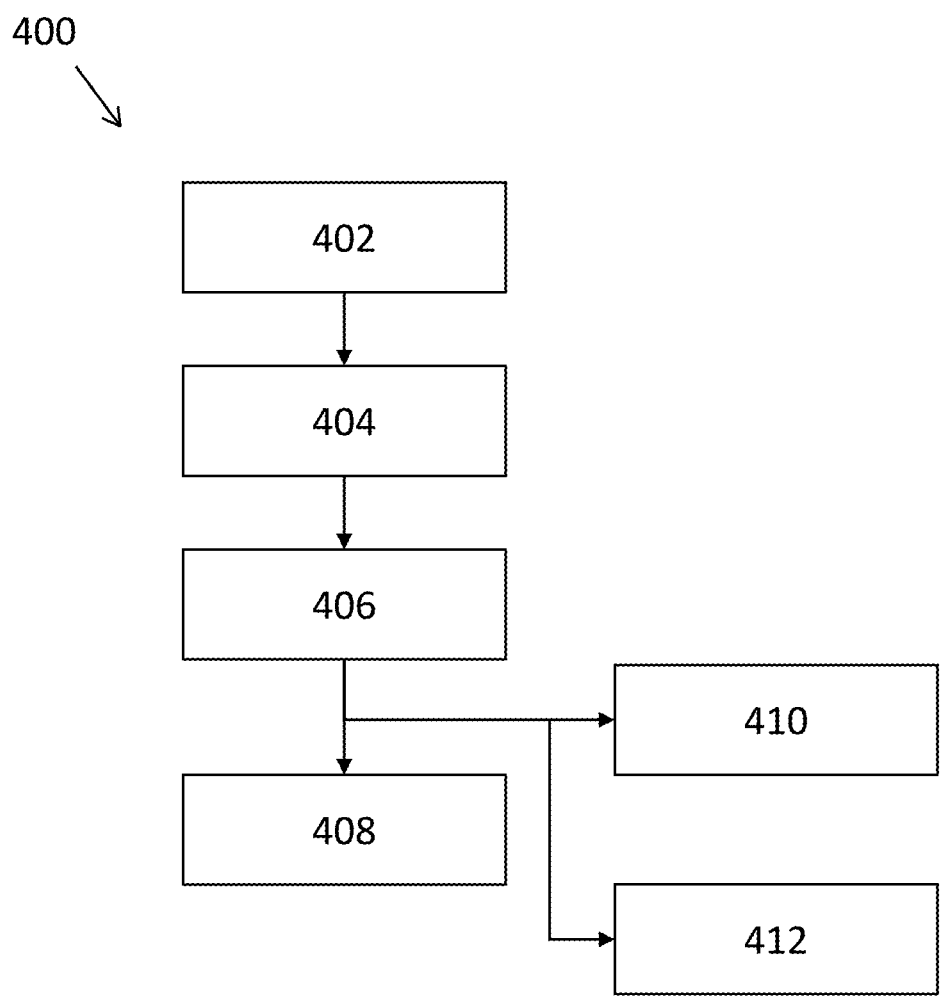
FIG. 4 shows a method of controlling a transport refrigeration system.

A method of controlling (e.g. using) a transport refrigeration system such as one of those described in reference to either FIG. 2 or FIG. 3 will now be described with reference to FIG. 4.

In step 402, a target container temperature is set/stored in a wireless module 4.

In step 404, a container 2 comprising a wireless module 4 is placed in a refrigerated compartment 14, 14a, 14b.

In step 406, a controller 20, 20a, 20b receives the target container temperature from the wireless module responsive to the container being placed in the refrigerated compartment 14, 14a, 14b.

In step 408, the controller 20, 20a, 20b controls the environment within the respective refrigerated compartment 14, 14a, 14b by controlling the operation of the refrigeration unit 15 in accordance with the target container temperature.

In the case where the refrigerated compartment 14, 14a, 14b has sufficient space for multiple containers 2, then steps 402-406 may be repeated (or performed simultaneously) with a second container 2 and a second wireless module 4.

Therefore the controller 20, 20a, 20b will receive a first target container temperature from a first wireless module secured to a first container and a second target container temperature from a second wireless module secured to a second container.

If the first target container temperature and second target container temperature are the same, then the controller 20, 20a, 20b is able to, as shown step 408, operate the refrigeration unit 15 in accordance with the first and second target container temperature (i.e. operate the refrigeration unit 15 such that the internal temperature of the refrigerated compartment 14, 14a, 14b is at the first and second target temperature).

However, if the first target container temperature and second target container temperature are not the same, then the containers 2 cannot be transported together in the same refrigerated compartment 14, 14a, 14b without the perishable goods of one of the containers 2 being stored in non-optimal conditions.

In this case, as shown in step 410, responsive to the first target container temperature and the second target container temperature not being equal, an alert is raised to inform the user/driver that containers 2/wireless modules 4 of different target temperatures have been loaded into the same refrigerated compartment 14, 14a, 14b. The alert may be a visual alert raised on the user device 22, or an audio alert such as an alarm.

Additionally or alternatively, as shown in step 412, responsive to the first target container temperature and the second target container temperature not being equal, the controller 20, 20a, 20b may operate the refrigeration unit in accordance with the one of the first and second target container temperature, or perhaps using an average temperature. The most appropriate temperature may be determined by various considerations, which may for example be implemented via logical rules at the controller 20, 20a, 20b. In some cases it may be that the system should use the temperature that is applicable for the majority of the containers 2 in the compartment 14, 14a, 14b. Alternatively, it may be that it is always to be the case that the lowest temperature should be used, e.g. if this would not damage goods indicated to be stored at a higher temperature. In other words, operating the refrigeration unit 15 such that the internal temperature of the refrigerated compartment 14, 14a, 14b is at the lowest of the first and second target internal temperature. Alternatively, the containers 2 may further indicate a priority concerning the temperature and the system may act to store higher priority goods at the specified temperature, thus allowing damage only for lower priority goods. This may help to minimise the risk of damage or spoilage to the perishable goods in the containers 2 if the driver/user does not notice that containers 2 with different target temperatures have been stored together.

Thus, when using the transport refrigeration systems 10 as described herein, the user/driver of the transport refrigeration system 10 is not required to set the target internal temperature of the refrigerated compartment 14 because the controller 20 is able to determine from the wireless module 4 what the target internal temperature of the refrigerated compartment 14 should be based on the target container temperature stored in the wireless module. Accordingly, human error associated with the use of the refrigeration system is reduced.

The invention claimed is:

1. A transport refrigeration system comprising:
a refrigerated compartment, a refrigeration unit operably coupled to the refrigerated compartment, and a controller for controlling the environment within the refrigerated compartment by controlling the refrigeration unit;
a first container and a second container for storing perishable goods;
a first wireless module secured to the first container and configured to store a first target container temperature; and
a second wireless module secured to the second container configured to store a second target container temperature;
wherein the controller is configured to:
receive the target container temperature from the wireless module responsive to the container being placed in the refrigerated compartment;
control the environment within the refrigerated compartment by controlling the operation of the refrigeration unit in accordance with the target container temperature; and
responsive to the first target container temperature and the second target container temperature not being equal:
raising an alert and/or controlling, using the controller, the operation of the refrigeration unit in accordance with the lowest of the first and second target container temperature.

2. A transport refrigeration system as claimed in claim 1, wherein the first or second wireless module is integrated into the first or second container.

3. A transport refrigeration system as claimed in claim 1, wherein the first or second wireless module comprises a control interface for setting the first or second target container temperature by a user; or wherein the refrigeration system comprises a transceiver for setting the first or second target container temperature in the first or second wireless module by a user.

4. A transport refrigeration system as claimed in claim 1, wherein the first or second target container temperature is permanently stored in the first or second wireless module; and the first or second wireless module and/or the first or second container comprises a visual indicator of the first or second target container temperature.

5. A transport refrigeration system as claimed in in claim 1, comprising a user device configured to display the first or second target container temperature and/or an internal temperature of the refrigerated compartment.

6. A transport refrigeration system as claimed in in claim 1, wherein the first or second wireless module comprises an RFID tag and wherein the transport refrigeration system comprises an RFID reader for providing information about the first or second target container temperature to the controller.

7. A transport refrigeration system as claimed in claim 1, comprising:
a first refrigerated compartment and a first controller for controlling the environment within the first refrigerated compartment; and
a second refrigerated compartment and a second controller for controlling the environment within the second refrigerated compartment;
wherein the refrigeration unit is operably coupled to both of the first refrigerated compartment and second refrigerated compartment; and
wherein the first refrigerated compartment and second refrigerated compartment each comprise shielding such that the transport refrigeration system is arranged to:
responsive to the first or second container being placed in the first refrigerated compartment, receive the first or second target container temperature by the first controller and control the environment within the first refrigerated compartment by controlling the refrigeration unit in accordance with the first or second target container temperature;
responsive to the first or second container being placed in the second refrigerated compartment, receive the first or second target container temperature by the second controller and control the environment within the second refrigerated compartment by controlling the refrigeration unit in accordance with the first or second target container temperature.

8. A method of controlling a transport refrigeration system, the refrigeration system comprising a refrigerated compartment, a refrigeration unit operably coupled to the refrigerated compartment, and a controller for controlling the environment within the refrigerated compartment by controlling the refrigeration unit; a first and second container for storing perishable goods; and a first and second wireless module secured to the first and second container, respectively, and configured to store a first and second target container temperature, the method comprising:
determining the first target container temperature and the second target container temperature;
responsive to the first target container temperature and the second target container temperature not being equal:
raising an alert and/or controlling, using the controller, the operation of the refrigeration unit in accordance with the lowest of the first and second target container temperature.

9. A method as claimed in claim 8, comprising:
setting the first or second target container temperature in the first or second wireless module using an interface of the first or second wireless module; or setting the first or second target container temperature in the first or second wireless module using a transceiver.

10. A method as claimed in claim 8, wherein the first or second target container temperature is permanently stored in the first or second wireless module; and the first or second wireless module and/or first or second container includes a visual indicator of the first or second target container temperature, and wherein the method comprises:
storing perishable goods in the first or second container that have a target temperature that corresponds to the first or second target container temperature indicated by the visual indicator of the first or second wireless module and/or first or second container.

11. A method as claimed in claim 8, comprising:
displaying, using a user device, the first or second target container temperature and/or an internal temperature of the refrigerated compartment.

12. A method as claimed in claim 8, wherein the transport refrigeration system comprises: a first refrigerated compartment and a first controller for controlling the environment within the first refrigerated compartment; and a second refrigerated compartment and a second controller for controlling the environment within the second refrigerated compartment; wherein the refrigeration unit is operably coupled to both of the first refrigerated compartment and second refrigerated compartment; and wherein the first refrigerated compartment and second refrigerated compartment each comprise shielding; the method further comprising:

placing the first or second container in either the first refrigerated compartment or second refrigerated compartment; and responsive to the first or second container being placed in the first refrigerated compartment, receiving the target container temperature by the first controller and controlling the environment within the first refrigerated compartment by controlling the refrigeration unit in accordance with the first or second target container temperature;

responsive to the first or second container being placed in the second refrigerated compartment, receiving the target container temperature by the second controller and controlling the environment within the second refrigerated compartment by controlling the refrigeration unit in accordance with the first or second target container temperature.

13. A computer-readable storage medium comprising instructions which, when executed by a controller of a transport refrigeration system, cause the controller to carry out a method of controlling the transport refrigeration system, the method comprising:

determining a first target container temperature of a first container and a second target container temperature of a second container;

responsive to the first target container temperature and the second target container temperature not being equal:

raising an alert and/or controlling, using the controller, the operation of the refrigeration unit in accordance with the lowest of the first and second target container temperature.

\* \* \* \* \*